United States Patent [19]
Dallon et al.

[11] 3,840,370
[45] Oct. 8, 1974

[54] CONTROLLING AFTER-HARDENING IN HARDENABLE HYDROPHILIC COLLOIDS

[75] Inventors: Dale S. Dallon; Mary K. Deseyn, both of Rochester, N.Y.

[73] Assignee: Eastman Kodak Company, Rochester, N.Y.

[22] Filed: May 7, 1973

[21] Appl. No.: 357,967

[52] U.S. Cl.................. 96/67, 96/111, 260/117, 106/125
[51] Int. Cl............................................. G03c 1/30
[58] Field of Search........ 96/111, 67; 260/117, 112; 106/125

[56] References Cited
UNITED STATES PATENTS
3,635,718   1/1972   Froehlich et al..................... 96/111
FOREIGN PATENTS OR APPLICATIONS
1,234,839   6/1971   Great Britain....................... 96/111

OTHER PUBLICATIONS

Schultz et al., Journal Organic Chemistry, 28, 1140–1142 (1963).

Primary Examiner—David Klein
Assistant Examiner—Won H. Louie, Jr.
Attorney, Agent, or Firm—John T. Lewis

[57] ABSTRACT

Blends of
a. diacrylamide, plus
b.   1,7-dichloro-3,3,5,5-tetraoxo-3,5-dithiaheptane exhibit synergism with respect to controlling beneficially the "afterhardening" that is usually observed when, for example, gelatin-containing compositions are chemically hardened. The hardened gelatin compositions are particularly useful as emulsion layers in photographic elements.

5 Claims, No Drawings

3,840,370

CONTROLLING AFTER-HARDENING IN HARDENABLE HYDROPHILIC COLLOIDS

This invention relates to compositions containing hydrophilic colloids which have been chemically hardened, to photographic emulsions containing such chemically hardened colloids, and to colloid/hardener admixtures useful in the manufacture of such hardened compositions. More particularly, this invention is directed to gelatin-containing compositions which have been hardened with a mixture of chemical hardeners, which mixture causes better "afterhardening" characteristics (in the hardened compositions) than can be obtained by use of either of the individual hardeners alone.

PRIOR ART

The use of a natural polymer such as gelatin, alone and in combination with synthetic polymers as vehicles, particularly for photographic purposes, often requires treatment with a succession of aqueous baths of variable pH or of increased temperature during the development of the photographic article. Much work has already been done in treating natural synthetic polymers to improve their resistance to water so that melting and an undesirable amount of swelling do not occur upon treatment thereof with aqueous solutions in processing operations or in hot drying. Various compounds have previously been found useful for treating photographic binders containing gelatin, for example.

Metallic salts, for instance, such as those of chromium, aluminum, and zirconium tend to react with and harden gelatin so very quickly that their addition, before shaping of the gelatin, in quantities required to achieve the desired hardening, involves the risk of premature coagulation of the gelatin solution.

Aldehydes such as formaldehyde are partly volatilized when materials containing them are dried, so that an accurate dosage is difficult to realize. Diketones of the 1,2-, 1,4-type, among which group the quinones might be considered members, tend to cause a loss of speed of photographic emulsion upon storage.

Other hardeners require strong heating to produce a sufficient degree of hardening. Strong heating is undesirable in the case of photographic silver halide gelatin emulsions and layers since it may easily lead to a reduction in sensitivity and formation of fog.

Certain other simple organic hardeners require a high molecular weight ballast in order to render them nondiffusible which often causes adverse physical characteristics in the photographic emulsion. Also, such hardeners usually contain an undesirably low ratio of active hardening groups to ballast groups.

Many of the known hardeners act slowly, so that a long period of time is necessary to attain a sufficiently stabilized state of hardening. As a consequence, the development properties and sensitometric characteristics of a photographic emulsion layer containing these hardeners changes in a manner which cannot be controlled adequately. This undesirable effect is designated as "afterhardening" and is particularly detrimental because, as the layer continues to harden during storage, its permeability to processing solutions decreases. This causes unpredictable problems during development and adversely affects the speed of the photographic layer.

Objects

It is an object of the present invention to provide compositions containing hardened hydrophilic colloids, which compositions have been chemically hardened by a synergistic combination of hardeners for the purpose of improving the afterhardening effect of such hardeners.

It is another object of this invention to provide photographic emulsion compositions containing hardenable hydrophilic colloids, which compositions can be coated on photographic supports and dried to yield hardened layers which exhibit improved afterhardening properties.

It is still another object of this invention to provide novel methods for improving the undesirable afterhardening effects that are observed when gelatincontaining compositions are chemically hardened with certain hardeners.

Other objects will become apparent in view of the following discussion and claims.

SUMMARY OF THE INVENTION

It has now been discovered that certain blends of (a) diacrylamide, plus (b) 1,7-dichloro-3,3,5,5-tetraoxo-3,5-dithiaheptane exhibit synergism with respect to controlling the undesirable afterhardening that has usually been observed when compositions which contain one or more hardenable hydrophilic colloids (such as, for example, layers in photographic elements) were chemically hardened heretofore. The weight ratio of $a$ to $b$ in the practice of this invention is from about 5:1 to about 1:5, respectively.

DETAILED DESCRIPTION OF THE INVENTION

The use of mixtures, blends, or combinations of (a) diacrylamide with (b) 1,7-dichloro-3,3,5,5-tetraoxo-3,5-dithiaheptane as chemical hardener compositions in materials containing hardenable hydrophilic colloids, such as photographic layers has been discovered to result in substantially improved afterhardening, as compared to the degree of afterhardening that results from the use of either of the hardener components alone. Thus, such combinations have a synergistic effect with respect to improving afterhardening of gelatin-containing compositions, which effect could not have been predicted from data previously available. The diacrylamide of this invention is described in British Patent No. 1,234,839, while 1,7-dichloro-3,3,5,5-tetraoxo-3,5-dithiaheptane type materials can be prepared from the corresponding sulfide according to the method of H. S. Schultz et al., Journal Organic Chemistry, 28, 1140 (1963) by oxidation with hydrogen peroxide.

The "hardenable hydrophilic colloids" useful in the practice of this invention are those generally known in the photographic art which can be hardened by formaldehyde. Thus, such hardenable hydrophilic colloids are materials such as gelatin which have melting points below about 65°C, and preferably between about 27°C. and about 50°C.

The mixtures of hardeners of this invention possess good hardening properties when they are blended with hardenable materials in any useful form such as in solution, emulsion or layer form. The mixtures can be used in any suitable hardening concentration which results in an increase in the melting point of the hardenable hydrophilic colloid of at least about 5°C, including for example concentrations of from about 0.5 to about 10 weight percent, based upon the dried weight of the hardenable material, and preferably within the range of from about 0.7 to 3 weight percent. These mixtures of hardeners are particularly useful in hardneing hardenable photographic light sensitive emulsion layers; more particularly, those which contain gelatin and photographic silver halide.

The hardener mixtures described in this application can be used most advantageously with natural or synthetic polymers used as vehicles or binders in preparing photographic elements. Specific materials which can be hardened according to the practice of this invention include hardenable materials such as polymers, for example, gelatin, colloidal albumin, proteins, dispersed polymerized vinyl compounds, particularly those which increase the dimensional stability of photographic materials as exemplified by amine-containing polymers of alkyl acrylates, methacrylates, acrylic acid, sulfoalkyl acrylates or methacrylates, maleic acid, and the like.

The hardening mixtures described herein can be used in various kinds of photographic emulsions. In addition to being useful in orthochromatic, panchromatic, and infrared emulsions, they are also useful in x-ray and other nonspectrally sensitized emulsions. They can be added to the emulsions before or after the addition of any spectral sensitizing dyes which may be used. They are effective in sulfur and gold sensitized silver halide emulsions.

In typical photographic usage, the mixtures of hardeners can be combined directly with the emulsion during its preparation, either as a mixture or as the individual components of the mixture. Then the treated emulsion can coated in layer form onto a substrate via conventional coating techniques and subsequently dried. The bulk of the hardening reaction (wherein the hardeners react with the hydrophilic colloid in the coated layer) preferably takes place during the drying step in such processes. The resulting dried, chemically hardened photographic elements can then be subjected to relatively higher processing (developing, fixing, etc.) temperature conditions than could otherwise similar, but unhardened, photographic elements without being physically degraded due to the higher temperature. Hardening can also be accomplished by contacting layer(s) of hardenable hydrophilic colloid material with an aqueous solution of one of the present hardener mixtures for a time, and at a temperature, which is sufficient to result in the desired degree of hardening (which can also take place during a subsequent drying step if desired).

The materials hardened in the practice of this invention can be coated on a wide variety of supports. Typical supports include those generally employed for photographic elements, as exemplified by cellulose nitrate film, cellulose acetate film, polyvinyl acetal film, polystyrene film, polyethylene terephthalate film, and related films of resinous materials as well as glass, paper, metal, wood and the like. Supports such as paper that are coated with α-olefin polymers, particularly polymers of α-olefins containing 2–10 carbon atoms (for example, polyethylene, polypropylene, ethylene butene copolymers, and the like) can also be employed.

In addition to the hardening mixtures disclosed herein, photographic emulsions and elements can also contain other additives, particularly those known to be beneficial in photographic emulsions, as exemplified by spectral sensitizers, speed-increasing materials, other hardeners, plasticizers, and the like.

The emulsions hardened by the mixtures of this invention can be used in photographic elements intended for color photography and thus may contain color-forming couplers. They may be used as emulsions to be developed by solutions containing such couplers or other color-generating materials or emulsions of the mixed-packet type.

The silver halides employed in the photographic emulsions include any of the photosensitive silver halides as exemplified by silver bromide, silver iodide, silver chloride, silver chlorobromide, silver chloroiodide, and the like. The silver halides used can be those which form latent images predominantly on the surface of the silver halide grains or those which form latent images inside the silver halide grains.

Hardened emulsions obtained in accordance with this invention employing gelatin or other hardenable hydrophilic colloids may be used in diffusion transfer materials. In one form of this process the undeveloped silver halide is complexed in nonimage areas of the negative to form a watersoluble compound which is permitted to diffuse to a receiving layer in which said compound precipitates out as a positive metallic silver image. In other diffusion transfer processes, the final image is produced by diffusion of the developer, oxidized developer, coupler or dye, from the exposed and developed light-sensitive layer to a second layer in close proximity thereto. It is particularly advantageous to employ the hardener mixtures of this invention with hardenable substances or in systems comprising photographic emulsions, layers or solutions of hardenable matter where very little afterhardening is advantageous.

The actual amount of afterhardening a particular product might undergo is impossible to predict, because the various conditions (temperature, humidity, pressure, and the like) to which such a product is exposed will determine the amount of afterhardening that takes place in any given product. However, a test has been devised in which the relative amount or degree of afterhardening caused by various chemical hardeners can be determined. Also, experience has shown that average predictions can be made (based on the results of this test) with a fairly high degree of confidence that test results are fairly comparable to results that are experienced, on the average, in actual product usage. This test is termed the "7 Day Swell Test" and is described in Example 1, below. Ideally, the data for "Δ% Swell" in the aforementioned 7-Day Swell Test should be zero or approximately zero, with such "ideal" figures meaning that very little to essentially no afterhardening took place under the test conditions. Whereas, many chemical hardeners are definitely commercially useful, the afterhardening effects of many of them nevertheless leave room for significant improvement. It is this significant improvement that can be accomplished in accordance with the present invention.

Example I

Three layer photographic elements were prepared by coating in a conventional manner on a cellulose acetate photographic support the following layers:

1. a gelatin sublayer containing 1.62 g gelatin per square meter;

2. a green sensitive silver bromiodide gelatin emulsion containing (per square meter), 1.45 g silver 32.3 g gelatin and 1.75 g of an incorporated magneta dye-forming coupler; and
3. a gelatin overcoat containing 32.3 g gelatin per square meter.

In addition to a "control" element, several elements were prepared using chemical hardeners and combinations of chemical hardeners. The hardeners were blended into the appropriate gelatin-containing dispersions shortly before the layers were coated. Then, after the layers were cast, they were chill-set and dried conventionally.

In a test for afterhardening samples of the elements prepared using various hardeners and amounts of hardeners (shown in Table I, below) were incubated for seven days at a temperature of 49°C and a relative humidity of 50%. A "check" sample of each was kept for the same period of time at 5°C and 50% relative humidity. Swell before and after immersion in distilled water for 5 minutes at room temperature was determined by measuring the thickness of the coated layers at these times. The hardeners which were tested were the following:

I   diacrylamide
II   bis(vinylsulfonylmethyl)ether
III   bis(vinylsulfonylethyl)ether
IV   1,7-dichloro-3,3,5,5-tetraoxo-3,5-dithiaheptane
V   N-methacryloylacrylamide
VI   N,N'-diacryloylurea
VII   formaldehyde
VIII   mucochloric acid Those data in Table I marked with an asterisk are derived from compositions of the present invention. Sample numbers 6, 7, 8, 13, 14, 15, 17, 20, 21, 22 and 23 are results from the use of hardener compositions which are the subject of copending U.S. Patent application Ser. No. 358,237, filed concurrently herewith.

Table I

| Sample No. | Hardener | (mm/g gel) | % Swell 7 Day Check 5°C/50% RH | % Swell 7 Day Inc. 49°C/50% RH | Δ% Swell Increase |
|---|---|---|---|---|---|
| 1 | — | — | 675 | 606 | 69 |
| 2 | I | 0.040 | 292 | 314 | −22 |
| 3 | I | 0.080 | 238 | 249 | −11 |
| 4 | II | 0.044 | 250 | 235 | 15 |
| 5 | II | 0.088 | 192 | 172 | 20 |
| 6 | I + II | 0.040 + 0.022 | 236 | 231 | 5 |
| 7 | I + II | 0.080 + 0.044 | 192 | 182 | 10 |
| 8 | I + II | 0.040 + 0.044 | 198 | 190 | 8 |
| 9 | formaldehyde | 0.334 | 175 | 200 | −25 |
| 10 | (control) none | — | 589 | 492 | 97 |
| 11 | II | 0.044 | 250 | 229 | 21 |
| 12 | I | 0.067 | 276 | 313 | −37 |
| 13 | I + II | 0.033 + 0.022 | 303 | 274 | 29 |
| 14 | I + II | 0.033 + 0.044 | 210 | 205 | 5 |
| 15 | I + II | 0.067 + 0.044 | 210 | 210 | 0 |
| 16 | V | 0.144 | 347 | 289 | 58 |
| 17 | II + V | 0.044 + 0.144 | 229 | 213 | 16 |
| 18 | VI | 0.030 | 279 | 342 | −63 |
| 19 | VI | 0.059 | 232 | 287 | −55 |
| 20 | II + VI | 0.022 + 0.030 | 231 | 238 | −7 |
| 21 | II + VI | 0.044 + 0.030 | 203 | 210 | −7 |
| 22 | II + VI | 0.022 + 0.059 | 187 | 215 | −28 |
| 23 | II + VI | 0.044 + 0.059 | 174 | 187 | −13 |
| 24 | III | 0.020 | 495 | 292 | 203 |
| 25 | III | 0.039 | 438 | 226 | 212 |
| 26 | I + III | 0.033 + 0.020 | 365 | 251 | 114 |
| 27 | I + III | 0.067 + 0.020 | 321 | 242 | 79 |
| 28 | I + III | 0.033 + 0.039 | 318 | 205 | 113 |
| 29 | I + III | 0.067 + 0.039 | 305 | 205 | 100 |
| 30 | IV | 0.019 | 462 | 369 | 93 |
| 31 | I + IV | 0.033 + 0.019 | 333 | 315 | 18* |
| 32 | I + IV | 0.067 + 0.019 | 318 | 305 | 13* |

Results of tests on these photographic elements carried out in an actual commercial photographic film development process (the "Kodak Ektachrome ME-4 Process", but without the prehardener and neutralizer steps) at a temperature of 52°C conform very well with the data appearing in Table I, above. Also, photographic tests involving conventional exposure on an Eastman 1B Sensitometer and then processing the film conventionally revealed that the synergistic hardener compositions of this invention are not photographically detrimental at ordinary use levels.

The invention has been described in detail with particular reference to preferred embodiments thereof, but it will be understood that variations and modifications can be effected within the spirit and scope of the invention.

What is claimed is:

1. In a photographic element comprising a support and at least one layer comprising photosensitive silver halide and at least one layer comprising a reaction product of
   i. at least one hardenable hydrophilic colloid, and
   ii. a hardener composition in a concentration sufficient to increase the melting point of said hydrophilic colloid at least about 5°C;
the improvement which comprises using as said hardener composition a combination of
   a. diacrylamide and
   b. 1,7-dichloro-3,3,5,5-tetraoxo-3,5-dithiaheptane; the weight ratio of $a$ or $b$ in said hardener composition being from about 5:1 to about 1:5.

2. A photographic element as in claim 1, wherein said hardenable hydrophilic colloid is gelatin.

3. A photographic element as in claim 2, wherein said weight ratio is from about 3:1 to about 1:3.

4. A photographic element as in claim 3, wherein the weight of said hardener composition in said layer is from about 0.7 to about 3 weight percent, based upon the dried weight of said gelatin.

5. In a photographic emulsion composition containing at least one hardenable hydrophilic colloid, at least one photosensitive silver halide, and a hardener composition in an amount sufficient to increase the melting point of said hydrophilic colloid at least about 5°C; the improvement which comprises using as said hardener composition a combination of
   a. diacrylamide and
   b. 1,7-dichloro-3,3,5,5-tetraoxo-3,5-dithiaheptane; the weight ratio of $a$ to $b$ in said hardener composition being from about 5:1 to about 1:5.

* * * * *